(12) United States Patent
Schwerdtner et al.

(10) Patent No.: US 7,950,802 B2
(45) Date of Patent: May 31, 2011

(54) METHOD AND CIRCUIT ARRANGEMENT FOR RECOGNISING AND TRACKING EYES OF SEVERAL OBSERVERS IN REAL TIME

(75) Inventors: Alexander Schwerdtner, Dresden (DE); Enrico Zschau, Dresden (DE)

(73) Assignee: SeeReal Technologies GmbH, Dresden (DE)

( * ) Notice: Subject to any disclaimer, the term of this patent is extended or adjusted under 35 U.S.C. 154(b) by 315 days.

(21) Appl. No.: 12/064,078

(22) PCT Filed: Aug. 16, 2006

(86) PCT No.: PCT/DE2006/001437
§ 371 (c)(1),
(2), (4) Date: Feb. 18, 2008

(87) PCT Pub. No.: WO2007/019842
PCT Pub. Date: Feb. 22, 2007

(65) Prior Publication Data
US 2008/0231805 A1 Sep. 25, 2008

(30) Foreign Application Priority Data
Aug. 17, 2005 (DE) .......................... 10 2005 040 598

(51) Int. Cl.
*A61B 3/14* (2006.01)
(52) U.S. Cl. ........................................ 351/210; 351/200
(58) Field of Classification Search .................. 351/210
See application file for complete search history.

(56) References Cited

U.S. PATENT DOCUMENTS

| | | | | |
|---|---|---|---|---|
| 5,867,587 | A | * 2/1999 | Aboutalib et al. | 382/117 |
| 5,912,980 | A | 6/1999 | Hunke | |
| 2003/0156742 | A1 * | 8/2003 | Witt et al. | 382/118 |

FOREIGN PATENT DOCUMENTS

GB 2 363 273 A1 12/2001

OTHER PUBLICATIONS

International Search Report, dated Sep. 20, 2007, issued in International Application No. PCT/DE2006/001437.
Tetsutani et al., Proceedings of the SPIE, vol. 2177, pp. 135-142 (1994).

(Continued)

*Primary Examiner* — Jordan M. Schwartz
*Assistant Examiner* — James C Jones
(74) *Attorney, Agent, or Firm* — Saul Ewing LLP

(57) ABSTRACT

The invention relates to a method and to a circuit arrangement for recognising and for tracking, in a contact-free manner, eye positions of several users in real time. The input data comprises a sequence of digital video frames. Said method comprises the following steps: combining a face-finder-instance which is used to examine faces, an eye-finder-instance which is used to examine eye areas, and an eye-tracker-instance which is used to recognise and track eye reference points. The aim of the invention is to convert the eye positions within a hierarchical outlet of the instance to the target, which successively restricts the dataset, which is to be processed, emerging from the dataset of the entire video frame (VF) in order to form a face target area (GZ) and subsequently an eye target area (AZ). Also, an instance or a group of instances, which run in a parallel manner, are carried out, respectively, on a calculating unit thereof.

14 Claims, 3 Drawing Sheets

OTHER PUBLICATIONS

Pastoor et al., IEEE Transactions on Multimedia, IEEE SErvice Center, vol. 1, No. 1 (1999).

Chew et al., Pattern Recognitiion Letters, vol. 16, No. 11, pp. 1197-1203 (1995).

Benton et al., Proceedings of the SPIE, vol. 3639, pp. 76-83 (1998).
Velipasalar et al., 2006 IEEE International conference on Multimedia and Expo, XP002441596 (2006).
Pollard et al., Design and Application of Parallel digital Processors, Intl. Specialist Seminar on the Lisbon, Portugal, London, UK, IEE, UK, pp. 43-47 (1988).
Goncalves et al., Computer Graphics, Image Processing, and Vision, Proceedings. Sibgrapi '98 Intl. Symposium on Rio de Janeiro, Brazil, pp. 426-433 (1998).
Fielding et al., Pattern Recognition, vol. 34, No. 3, pp. 531-545 (2001).
International Preliminary Report on Patentability, dated Jul. 10, 2008, issued in International Application No. PCT/DE2006/001437.

* cited by examiner

METHOD AND CIRCUIT ARRANGEMENT FOR RECOGNISING AND TRACKING EYES OF SEVERAL OBSERVERS IN REAL TIME

CROSS REFERENCE TO RELATED APPLICATIONS

This application claims the priority of PCT/DE2006/001437 filed on Aug. 16, 2006, and DE 10 2005 040 598.3 filed on Aug. 17, 2005, the entire contents of which are hereby incorporated in total by reference.

BACKGROUND OF THE INVENTION

1. Field of the Invention

The present invention relates to a method and a circuit arrangement for a contactless detection and tracking of eye positions or pupils of multiple observers in real-time mode. The input data comprises image material in the form of a sequence of digital video frames which are acquired by one or multiple image sensors.

Reference points of the eyes of multiple observers can be determined without the need for any additional auxiliary means such as glasses, headgear or spots.

In contrast to stationary applications, for example the monitoring of drivers or pilots, where the range of motion, and in particular the depth range is very limited and thus almost stationary, this invention serves to detect the eye positions in a large target region, it copes with quick observer movements, and it determines the depth coordinate in a relatively large range, e.g. between 0.5 and 3.5 m.

The efficient and precise real-time realisation of the eye detection is a major human-machine-interface. A major field of application of the invention is a device for detecting and tracking eye positions of users of autostereoscopic displays. Such displays provide the observers with a stereoscopic image impression without the need for any auxiliary means, such as polarisation glasses. Further applications of the invention comprise for example the video holography and implementations in the area of the detection of persons, faces or viewing directions.

Autostereoscopic displays, where the presentation is tracked by means of a so-called tracking device, provide multiple observers with a great mobility in a large visibility region. The error-free detection and tracking of eyes, eye positions or pupils is an important human-machine-interface in these fields of image representation, too.

A tracking device which works reliably and error-free is usually not noticed by an observer. In many applications, however, errors of the tracking system cause undesired side-effects, which, for example, in the field of 3D applications, cause faulty reconstruction or crosstalk. A tracking device is required to have great precision, reliability and accuracy. The system must also be adequately efficient and precise in order to be able to track correctly all major movements and so allow the observer to move as freely as possible in all three dimensions.

2. Description of Related Art

Several types of contactless tracking systems are commercially available. Simple models usually feature a basic application software for standard operating systems and have standardised hardware and software interfaces.

Document WO 03/079 902 A1, "Real-time eye detection and tracking under various light conditions", Zhiwei Zhu Qiang Ji, describes a method for contactless real-time eye detection which comprises mainly an eye position detection step and an eye tracking step. The eye position detection step includes a combination of the method of active illumination and a pattern recognition. After the eyes of an observer have been detected for the first time the tracking of the eyes is carried out, the latter step comprising the combination and synthesis of several algorithms and techniques. Despite the combination and synthesis of several means, there is still the problem that major and abrupt movements of the head in all three dimensions cannot be tracked in real-time and that a real-time processing may be prevented due to the delay between the provision of the position data and the image acquisition. This applies in particular to the detection of the eye position in the depth dimension at unfavourable ambient conditions.

In a vehicle, for example, the driver's face is always situated within a predictable distance to the instrument panel. Moreover, there are only small variations of the movements in vertical and horizontal direction. In particular, the real range of motion in the depth dimension is very small, so that usually the depth position can be extrapolated with sufficient precision even if only one camera is used.

The object of the present invention is to provide a large range of motion in all three dimensions of a viewing space while offering short computing times. In contrast to the mentioned prior art, it is necessary to detect the eyes in all three dimensions, that is including the depth dimension. The depth range shall preferably comprise a large range from 0.5 to at least 3.5 metres. For determining the depth, on the one hand a multitude of independently arranged cameras is required for being able to take images of the target region from several perspectives. Moreover, the detection of the eyes at a distance of up to several metres requires the cameras to have a great resolution, which results in a large amount of data per camera and per video frame.

The problem of real-time processing of a large amount of data becomes graver when there are several observers to be detected. In particular, very computation-intensive process steps are required in order to be able to detect observers which are difficult to distinguish due to illumination effects, reflections or eyeglass lenses. Experience shows that the detection of a third or fourth person who is partly concealed or who stands a little aside can often only be achieved with an extensive, time-consuming computational effort. However, the required computational effort for the observer who is momentarily least easily detectable and who is only detectable with great effort must not adversely affect the real-time tracking of the other observers.

Problems with the detection of eye positions lead to the fact that the input video frames may not permanently be processed in the real-time mode any more. A maximum acceptable computing time per person and per frame may be exceeded if eyeglass lenses or earpieces cover the eyes, or if an observer turns away from the cameras abruptly, but only for a moment.

Being aware of the disadvantages of the prior art, it is an object of the present invention to provide a method which allows to detect the eye positions of multiple observers in real time even if the observer(s) move their heads significantly, abruptly and in all three dimensions. The method shall detect the eye positions in a large target region, shall compensate abrupt movements of the observers and shall determine the depth coordinate in a large range. Moreover, while minimising the amount of errors, the response time between the image acquisition, that is the reading of a video frame, and the output of a result, that is the providing of the eye positions, shall be sustainedly reduced. Furthermore, the method shall allow to achieve error-free results in the real-time mode also if high-resolution cameras are used.

SUMMARY OF THE INVENTION

The method is used for real-time detection and tracking of reference points of eyes of multiple observers. The input data comprises image data in the form of a sequence of digital video frames which are acquired by one or several image sensors, for example cameras. The eye reference points are the positions of the pupils and/or corners of the eyes.

The method comprises the coaction of a face finder instance for detecting faces, followed by a hierarchically subordinate eye finder instance for detecting eye regions, and an eye tracker instance for detecting and tracking eye reference points. The eye tracker instance is hierarchically subordinate to the eye finder instance.

The invention is based on the idea that the eye position finding is realised within a hierarchically organised routine which aims to gradually reduce the search region starting with a total video image. The real-time behaviour is achieved thanks to the hierarchical, gradual reduction and interleaving of the search region, starting with the total video frame for the face finder instance to the reduced target face region for the eye finder instance or the eye tracker instance. Further, an instance or a group of instances is in each case executed in a dedicated computing unit, while executing separate processes in parallel.

The face finder instance searches in the region of a total video frame for the head or face position of each observer. The instance thus determines from the data of the total video frame, which represent the respective target face region, a much smaller amount of data for every face, and provides this limited region to the eye finder instance.

The eye finder instance is hierarchically subordinate to the face finder instance. From the data of the provided target face region, the eye finder instance must only process a strongly reduced amount of data. In this data, the instance determines the eyes or eye positions and defines again a much lower amount of data than the target face region as target eye region. Only this limited search region is provided to a next, hierarchically subordinate eye tracker instance.

Then, the eye tracker instance at high speed determines in this strongly reduced amount of data of the eye search region, the eye reference points sought-after. By trimming down the search regions hierarchically and by reducing the volume of data the eye tracker instance works highly efficient and quick.

According to this invention, for reduction of the total delay time of the process, the face finder instance and eye finder instance/eye tracker instance shall be executed independently of each other in separate, parallel processes.

The parallelisation by means of assigning an instance or a group of instances to a dedicated computing unit can be implemented in a number of embodiments.

In a particularly preferred embodiment of the invention, one face finder instance is executed for each camera in a dedicated computing unit. Then, to each observer who is detected by a face finder instance, a dedicated computing unit is assigned for realising an eye finder instance and, subsequently, an eye tracker instance. If a face finder instance detects a new face, an instance of the eye finder and of the eye tracker is instructed or initialised immediately, and these instances will be executed in a dedicated, specifically assigned computing unit. An immediate tracking on face detection is also realised for faces which were briefly lost, but are re-detected.

A major benefit of this invention is that a face finder instance is in no way blocked or delayed, because the subordinate instances are now executed in dedicated computing units. The face finder instance continues to search for faces in the data of the current video frame while maintaining all other computing resources. Intermediate and partial search results, which have been determined, are transmitted to a control instance for further processing/distribution, or partial results provided by the eye tracker/eye finder instances are received by the control instance in order to be able to extrapolate in a positive control loop the target face regions.

The immediate realisation of the instances sustainedly cuts the response time of the method and forms the first basis for a real-time behaviour.

The real-time behaviour is further supported by the hierarchical, gradual reduction and interleaving of the search region, starting with the total video frame for the face finder instance to the reduced target face region for the eye finder instance or the eye tracker instance.

Finally, according to the invention, the real-time behaviour is further supported and ensured by executing an instance or a group of instances in parallel within separate processes in dedicated computing units. Further options are possible as regards the parallelity of instances. As said above, a face finder instance and an eye finder/eye tracker instance can be executed in dedicated computing units. Furthermore, a face finder/eye finder instance and an eye tracker instance can be executed in dedicated computing units. It seems also possible to execute the eye finder instance in a dedicated computing unit. However, this is an instance which requires relatively little computing time, so that it is preferably assigned to one of the computing units used by the computation-intensive face finder or eye tracker instances.

Both the process of the instances and the data exchange among the instances are preferably controlled and monitored by a control instance. In particular, that instance controls the assignment of detected faces or target face regions to the eye finder/eye tracker instances on the dedicated computing units. The data exchange involves mainly the re-initialisation of the instances by assigning the search regions, the exchange of partial and final results of the instances, and the transmission of the resulting eye reference points to an external interface.

For example, the control instance updates and re-initialises the eye finder and eye tracker instances corresponding with an already tracked face. The control instance selects, verifies and evaluates the confidence of the found target face regions and target eye regions. Corresponding evaluation parameters are determined by the instances in the course of the process and used by the control instance to realise an optimum instance process control and an assignment of available computing units, too.

The method according to the invention allows to detect the eye positions of multiple observers in real-time even if the observers move their heads significantly and abruptly in all three dimensions. It was further verified that the method results can achieve results in real-time mode also with the amount of data of high-resolution cameras.

BRIEF DESCRIPTION OF THE DRAWINGS

The following figures illustrate embodiments of the method according to the invention, being used in conjunction with a tracking device for an autostereoscopic display.

DETAILED DESCRIPTION OF THE INVENTION

Figure 1:
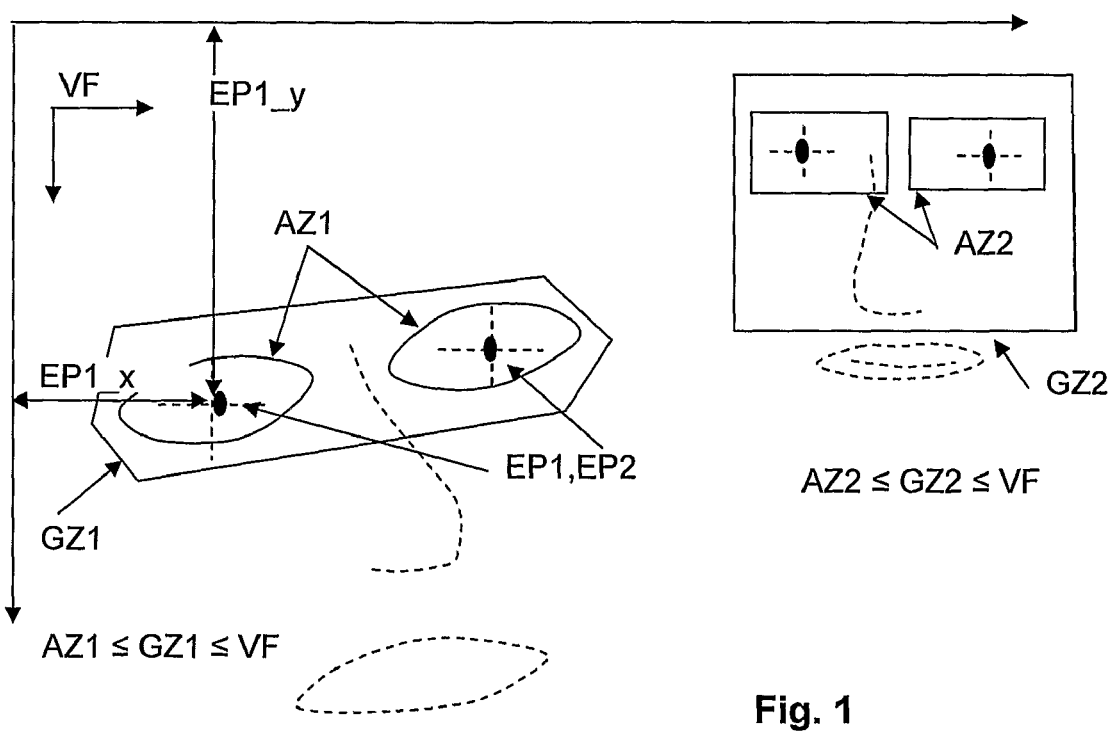
FIG. 1 shows a schematic representation of the interleaved, reduced search regions of the face finder, eye finder and eye tracker instances.

FIG. 1 shows the interleaved, reduced search regions of the instances of the method. Image material as sequence of digital video frames VF of multiple image sensors, e.g. a stereo infrared camera, is acquired as input data. FIG. 1 shows a portion of the total video frame VF schematically, defined by the coordinate system.

A first face finder instance analyses the data of the total video frame VF and detects in the total video frame the observer faces. In FIG. 1 the data of two faces is shown. The first face (left) is apparently situated near the camera, while the second face (right) has a greater distance to the camera.

The face finder instance determines from the data of the total video frame VF for each detected face a reduced data region which corresponds with the target face region GZ. The indices are related to the first face, shown left in the figure. The determined target face region GZ now forms the reduced search region for the subsequent eye finder instance. The eye finder instance determines in that search region the eye positions and reduces, as a result, the amount of data of the target face region GZ further to get an even lower amount of data which corresponds with the target eye region AZ.

The data of the target eye region AZ with the eye positions are the input data for a subsequent eye tracker instance ET, which now detects in the target eye region AZ in the current video frame and, according to the already determined movement sequence, in the tracked target eye region AZ in the following video frames eye reference points to be output as a result.

The information of the reference points of the past video frames is, according to the observer movement, used to track and to update the target eye region AZ, and to extrapolate the regions in the current and the subsequent video frames. If the observer moves in the depth dimension, the image content may additionally have to be resized.

As shown in the figure, the target eye region may comprise several discontiguous portions. As further shown in the figure, these target regions are of irregular, but preferably convex shape, depending on the position of the observer head and his viewing direction. In a simple embodiment, these regions are represented by a list of parameterised geometrical surfaces, such as ellipses, circles or rectangles.

Figure 2:
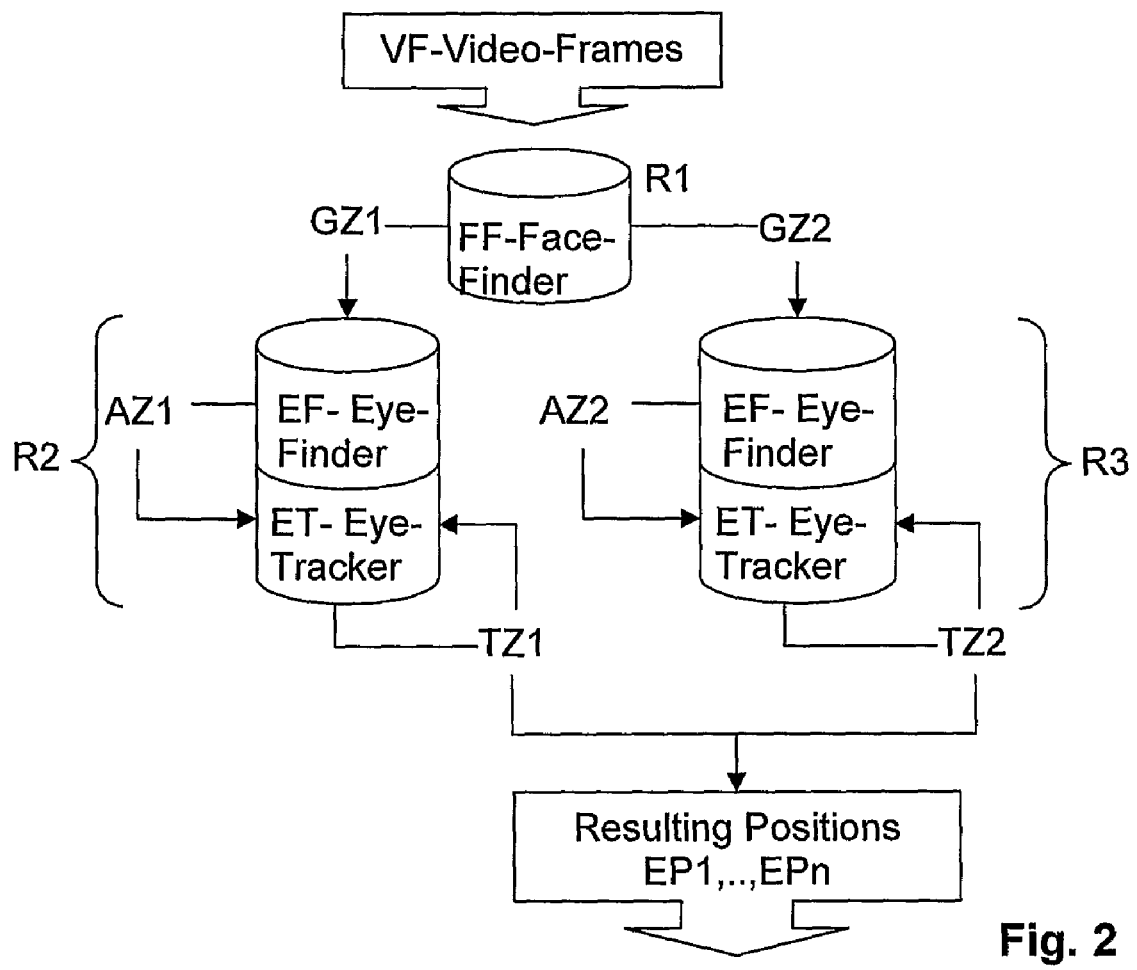
FIG. 2 shows a flow chart of the parallelisation of the hierarchically structured instances of the method according to the invention.

FIG. 2 is based on the last embodiment and shows a flow chart of the parallelisation of the instances. The figure describes the hierarchic structure of the face finder instance FF, eye finder instance EF and eye tracker instance ET and the assignment to dedicated computing units R1 to R2.

Three computing units R1 to R3 are available in this embodiment. A first computing unit R1 is dedicated to the face finder instance FF. This instance detects in the data of a video frame the face of a first observer and determines the target face region GZ. Now, a dedicated computing unit is immediately assigned to the target face region in order to execute an eye finder instance and, subsequently, an eye tracker instance.

The figure shows the flow of the data of the reduced target regions, i.e. the target face region GZ and the target eye region AZ to the subsequent instances, respectively. An eye tracker instance ET provides the data of the eye reference points to a higher-level control instance (not shown) or to an external interface. At the same time, the information of the reference points detected in previous video frames is used to track the target eye region AZ and to extrapolate it for following frames if the observer moves. The data of the current target eye region and of the regions of previous frames are thus both used by the eye tracker instance ET, as shown in the figure.

The second observer is detected and tracked in the same way. If there are more observers than computing units, an eye finder/eye tracker instance is preferably executed for each observer (or, in other words, for each target face region), so that multiple independent and separate processes are executed, where naturally multiple processes are executed in a common computing unit.

Figure 3:
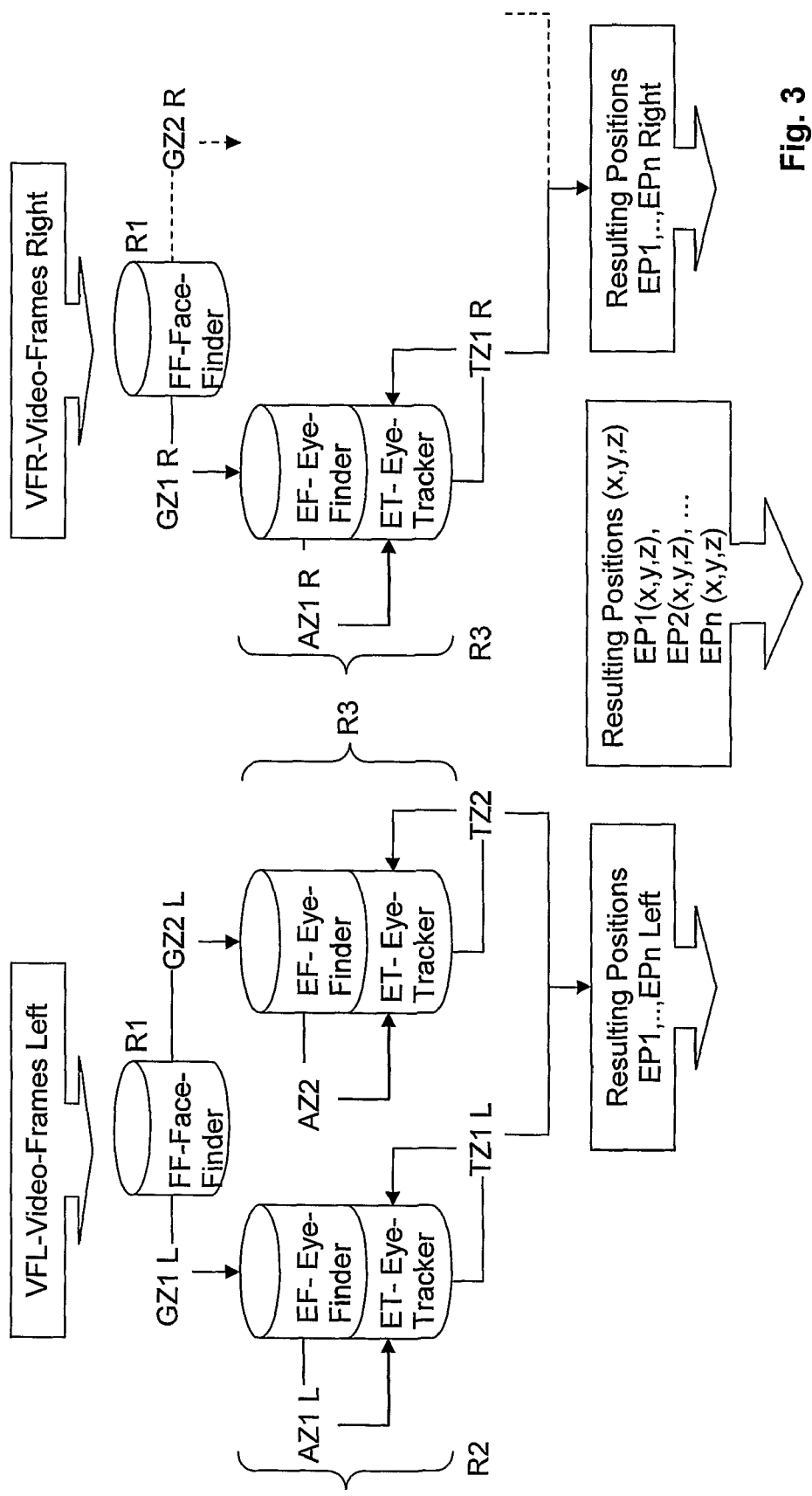
FIG. 3 shows a schematic representation of the circuit arrangement and a flow chart of the parallelisation of the hierarchically structured instances of the method according to the invention.

FIG. 3 shows the circuit arrangement and a flow chart of the parallelisation of the hierarchically structured instances and a parallelisation of the method, with the help of the image data of multiple cameras in different positions. For eye detection and tracking each camera is based on a method according to the above embodiments. Each camera is thus assigned with a parallelisation of the instances as shown in FIG. 1 and FIG. 2.

The left-hand side system detects on the basis of the left-hand side image data VFL (video frame left) the target face region GZ1-L of the first observer with the help of a face finder instance FF executed in a first computing unit R1. The corresponding eye finder instance EF and eye tracker instance ET are executed in the computing unit R2. Regarding the circuit arrangement, these computing units are typically configured in the form of CPUs or DSPs.

A second group of instances on the computing unit R3 is assigned to a second observer. The other instances and computing units shown in the figure, which are denoted VFR (video frame right), and identified by the index 'R', are related to the right-hand side image and the corresponding instances or elements of the circuit arrangement.

An implemented control unit, which is not shown in the figure, takes the role of controlling the individual processes and organising the exchange of data during the process. The exchange of data proceeds in particular among the computing units which are related to an observer. For example, already available information of the left image is used to determine and to extrapolate the position in the right image, which contents does not substantially differ from the left image, with an acceptable tolerance. A transformation of partial results is possible based on the x-y pixel position of the eye in the left image, the distance of the observer as determined in the previous depth calculation and the camera parameters. For example, the data of a target eye region AZ1-L found in the left half-image are defined as input parameter for the right half-image AZ1-R, and transformed if necessary. Now, it is possible to use other algorithms or other controlling parameters than those used for the left-hand-side process.

The information required for this calculation comprise mainly the resolution and pixel pitch of the cameras, the focal length of the object lens, the distance between the image of the object lens and the camera, and the distance and orientation of the cameras.

The circuit arrangement comprises mainly communicating, programmable logic modules, processors, ROMs and RAMs. The computing units are preferably only optimised and configured for the intended purpose, in particular for the above-mentioned instances. In a further preferred embodiment the circuit arrangement additionally contains dedicated computing units to execute auxiliary processes, such as the resizing, gamma correction etc.

The invention claimed is:

1. Method for detecting and tracking eye reference point positions of multiple observers, wherein the eye reference point positions are the positions of the pupils and/or the corners of the eyes, in image data of video frames, which are acquired by at least one image sensor, the method comprising:

face finder instance for detecting face positions in video frames, said face finder instance extracting a much smaller sub-region from the total video frame as target face region for each face in order to transmit information of said target face region to at least one subsequent eye finder instance for detecting eye positions, said eye finder instance extracting a much smaller sub-region from each target face region as target eye region in order to transmit information of said target eye region to at least one subsequent eye tracker instance for tracking the eye positions, said eye tracker instance detecting the eye reference point positions in the target eye region in the current video frame and in the subsequent video frames and generating information for a tracking device, wherein each of the instances, or the face finder instance combined with one of the eye finder instance and the eye tracker instance, or a combination of the face finder instance and the eye finder instance and the eye tracker instance, are executed each in a dedicated computing unit proceeding in parallel with each other.

2. Method according to claim 1, wherein the coordinates of the reference point positions are horizontal and vertical positions.

3. Method according to claim 2, wherein the depth coordinates of the eyes are determined based on two-dimensional reference point positions of multiple image sensors.

4. Method according to claim 3, wherein the face finder instance and a combination of the eye finder instance and the eye tracker instance or a combination of the face finder instance and the eye finder instance and the eye tracker instance are executed in respectively dedicated computing units.

5. Method according to claim 3, wherein for each detected face an eye finder instance and an eye tracker instance are initialised and executed in at least one dedicated computing unit.

6. Method according to claim 3, wherein a valuation order is assigned to the observers and/or the resulting target eye positions, said order being used for the assignment of computing units.

7. Method according to claim 3, wherein one or several face finder instances are executed permanently and initialise the respectively assigned eye finder/eye tracker instances.

8. Method according to claim 1 with a control instance which determines whether a target face region found by the face finder instance results from an already tracked face or from a newly detected face, which assigns the eye tracker instance or a combination of the eye finder instance and the eye tracker instance to the available computing units, initialises them and which synchronises the execution of all instances.

9. Method according to claim 1, wherein image data is acquired by multiple image sensors, wherein an eye finder instance, an eye tracker instance or a combination of the eye finder instance and the eye tracker instance is executed per observer and image sensor in dedicated computing units, and wherein partial and/or final results are exchanged among and processed by the instances respectively related to an observer.

10. Method according to claim 9 wherein, knowing the positions of the image sensors and of the observers as well as parameters of the image sensors, the partial and/or final results of the instances of an image sensor are transformed for the instances of another image sensor and adapted to its perspective.

11. Circuit arrangement for detecting and tracking eye reference point positions of multiple observers, wherein the eye reference point positions are the positions of the pupils and/or the corners of the eyes, in image data of video frames with multiple communicating computing units with a face finder instance, an eye finder instance and an eye tracker instance, wherein the face finder instance serves to detect the face positions in video frames and extracts a much smaller sub-region from the total video frame as target face region for each face in order to transmit information of said target face region to at least one subsequent eye finder instance for detecting eye positions, said eye finder instance extracting a much smaller sub-region from each target face region as target eye region in order to transmit information of said target eye region to at least one subsequent eye tracker instance for tracking the eye positions, said eye finder instance detecting the eye reference point positions in the target eye region in the current video frame and in the subsequent video frames and generating information for a tracking device, wherein each of the instances, or the face finder instance combined with one of the eye finder instance and the eye tracker instance, or a combination of the face finder instance and the eye finder instance and the eye tracker instance, are executed each in a dedicated computing unit proceeding in parallel with each other.

12. Circuit arrangement according to claim 11 with a separate computing means for the scaling or correction of the image data as regards scaling, gamma correction, brightness control or suchlike.

13. Circuit arrangement according to claim 11 with a computing means which calculates the depth coordinates from the reference points determined from at least two image sensors.

14. Circuit arrangement according to claim 11, wherein at least one of the computing units is implemented as CPU, DSP or suchlike.

* * * * *